United States Patent
Kim

(10) Patent No.: US 7,314,421 B2
(45) Date of Patent: Jan. 1, 2008

(54) POWER SYSTEM OF HYBRID VEHICLES

(75) Inventor: Yeon Ho Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 128 days.

(21) Appl. No.: 11/302,404

(22) Filed: Dec. 12, 2005

(65) Prior Publication Data

US 2007/0042853 A1    Feb. 22, 2007

(30) Foreign Application Priority Data

Aug. 18, 2005    (KR) ...................... 10-2005-0075700

(51) Int. Cl.
*F16H 3/72*    (2006.01)
(52) U.S. Cl. ........................................... 475/5
(58) Field of Classification Search ................ 903/910, 903/911, 923, 926; 475/1, 5, 221, 200, 337, 475/903; 180/65.2–65.4
See application file for complete search history.

(56) References Cited

U.S. PATENT DOCUMENTS

| | | | |
|---|---|---|---|
| 6,692,394 B2 * | 2/2004 | Takenaka ........................ | 475/5 |
| 6,896,080 B2 * | 5/2005 | Takenaka .................... | 180/65.2 |
| 7,086,977 B2 * | 8/2006 | Supina et al. ................. | 475/5 |
| 2001/0006919 A1 * | 7/2001 | Takenaka ........................ | 475/5 |
| 2004/0251862 A1 * | 12/2004 | Imai ........................... | 318/376 |
| 2005/0137043 A1 * | 6/2005 | Kinugasa et al. .............. | 475/5 |
| 2006/0046886 A1 * | 3/2006 | Holmes et al. ................ | 475/5 |

FOREIGN PATENT DOCUMENTS

| | | |
|---|---|---|
| DE | 19606771 A1 | 8/1997 |
| DE | 69813748 T2 | 10/2003 |
| DE | 69732387 T2 | 1/2006 |
| JP | 08-183347 | 7/1996 |
| JP | 2000142138 A * | 5/2000 |
| JP | 2001010361 A * | 1/2001 |
| JP | 2001-246943 | 9/2001 |
| JP | 2003-127681 | 5/2003 |
| JP | 2003-291659 | 10/2003 |
| JP | 2003-291671 | 10/2003 |
| JP | 2004-066898 | 3/2004 |
| KR | 1020010062671 A | 7/2001 |

* cited by examiner

*Primary Examiner*—Charles A. Marmor
*Assistant Examiner*—Justin K. Holmes
(74) *Attorney, Agent, or Firm*—Morgan Lewis & Bockius LLP

(57) ABSTRACT

A power system of a hybrid vehicle having a decreased total length includes a first planetary gear set and a generator disposed on a first input shaft, which receives rotation power of an engine, and a motor disposed on an axis parallel to the first input shaft. An output power speed of the first planetary gear set is reduced by a second planetary gear set on a counter shaft and is then transmitted to a driving wheel via a differential.

3 Claims, 1 Drawing Sheet

POWER SYSTEM OF HYBRID VEHICLES

CROSS-REFERENCE TO RELATED APPLICATION

This application claims priority to and the benefit of Korean Patent Application No. 10-2005-0075700 filed in the Korean Intellectual Property Office on Aug. 18, 2005, the entire contents of which are incorporated herein by reference.

BACKGROUND OF THE INVENTION (a) Field of the Invention

The present invention relates to a power system of a hybrid vehicle, and, more specifically, to a power system of a hybrid vehicle having a decreased total length.

(b) Description of the Related Art

Hybrid vehicles are driven by efficiently combining at least two different power sources, and the majority of hybrid vehicles, called hybrid electric vehicles, include an engine obtaining power from a fuel and an electric motor driven by electric power.

Since such hybrid vehicles use an engine as the main power source and use a motor as an auxiliary power source, they have an advantage in that a ratio of changing mechanical energy to electrical energy is small and power transmission efficiency is high.

However, since an engine, a generator, and a motor are conventionally disposed on one shaft, there is a problem in that a total length is increased and rotation speed and torque cannot be independently set.

In addition, if the total length is increased as stated above, an F-F type vehicle has a small steering angle and so a rotating radius increases.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a power system of a hybrid vehicle having advantages of decreasing a total length by disposing a motor on a separate axis line and decreasing a total height and a manufacturing cost by eliminating one shaft by using a planetary gear set as a speed reduction member.

In a power system of a hybrid vehicle according to an exemplary embodiment of the present invention, a first planetary gear set and a generator are disposed on a first input shaft receiving a rotation power of an engine, a motor is disposed on an axis parallel to the first input shaft, and an output power speed of the first planetary gear set is reduced by a second planetary gear set on a counter shaft and is then transmitted to a driving wheel via a differential.

In order to transmit a rotation power of the motor to an output element of the first planetary gear set, a second input shaft connected to an output element of the first planetary gear set may be disposed on the same axis line with the first input shaft and may be connected to the motor by a transmission member.

The transmission member may be a chain connecting a motor output sprocket and a motor input sprocket that are respectively provided to a motor shaft of the motor and the second input shaft.

The second planetary gear set may include a sun gear, a planetary carrier, and a ring gear as operational elements thereof. The ring gear may be connected to an output shaft of the first planetary gear set as an input element, the planetary carrier may be connected to the differential as an output element, and the sun gear may be connected to a housing as a fixed element.

DESCRIPTION OF THE PREFERRED EMBODIMENTS

Figure 1:
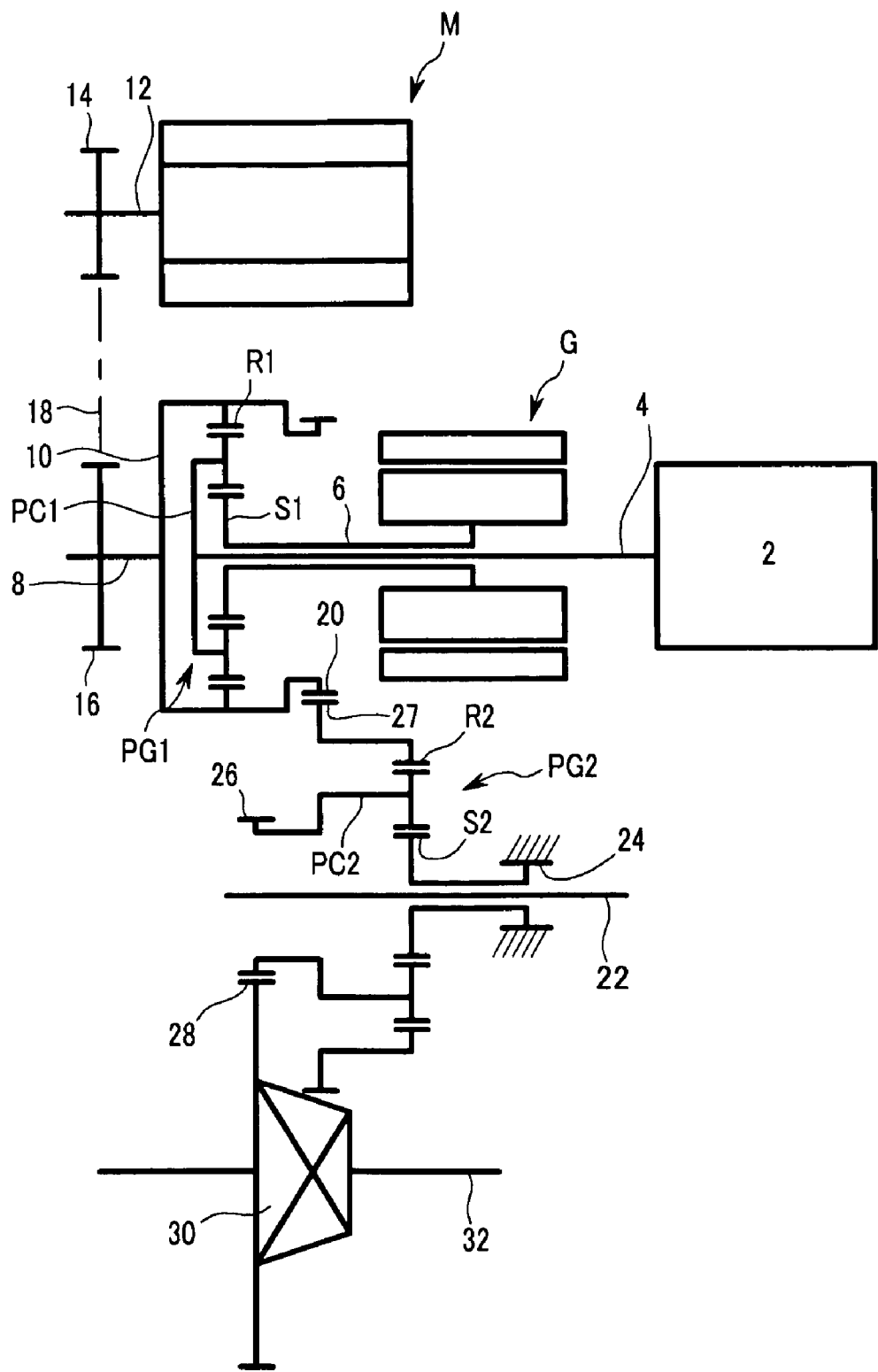
FIG. 1 is a schematic view of a power system of a hybrid vehicle according to an exemplary embodiment of the present invention.

An exemplary embodiment of the present invention will hereinafter be described in detail with reference to the accompanying drawing.

As shown in FIG. 1, a first planetary gear set PG1 is arranged on a first input shaft 4 receiving power from an engine 2, and a generator G is disposed at a forward side (right side in the drawing) of the first planetary gear set PG1.

The first planetary gear set PG1 is formed as a single pinion planetary gear set having a first sun gear S1, a first planetary carrier PC1, and a first ring gear R1 as operational elements thereof. The first planetary carrier PC1 is fixedly connected to the first input shaft 4 so as to always act as an input element, and the first sun gear S1 is connected to the generator G by a first power transmission member 6 that is disposed outside the first shaft 4 without any rotation interference with the first shaft 4.

In addition, a second input shaft 8 is disposed at a rear side of the first input shaft 4 on the same axis line with the first input shaft 4, and the second input shaft 8 is connected to the first ring gear R1, which is an output element, by a second power transmission member 10. A motor M is disposed on an axis line parallel with the first and second input shafts 4 and 8, and the second input shaft 8 is configured to receive power of the motor M via a chain transmission.

In order for power delivery via the chain transmission, a motor output sproket 14 is provided to a motor shaft 12, a motor input sprocket 16 is provided to the second input shaft 8, and the motor output sprocket 14 and the motor input sprocket 16 are connected to each other by a chain 18.

In addition, a drive gear 20 is fixedly connected to the ring gear R1 that is an output element, and the drive gear 20 transmits rotation power to a second planetary gear set PG2 disposed on a counter shaft 22.

The second planetary gear set PG2 is formed as a single pinion planetary gear set having a second sun gear S2, a second planetary carrier PC2, and a second ring gear R2 as operational elements thereof. The second sun gear S2 is fixed to a housing 24 so as to act as a reaction element. The second planetary carrier PC2 acts as an output element and is connected to a final gear 26. The second ring gear R2 acts an input element by receiving power via a driven gear 27 that is formed at an outer circumference thereof.

That is, in the second planetary gear set PG2, the second ring gear R2 acts as an input element, and the second sun gear S2 acts as a fixed element, so that the second planetary gear set PG2 outputs a power of a reduced speed through the second planetary carrier PC2.

In addition, rotation power of the final gear 26 transmitted from the second planetary carrier PC2 is transmitted to a differential gear 28 and is then transmitted to a driving shaft 32 via a differential 30, thereby driving the wheels (not shown).

In the exemplary embodiment, power is output to the drive gear 20 that is connected to an output element of the first planetary gear set PG1 by the same process as a conventional hybrid vehicle, i.e., by using power of the engine 2 as the main power and power of the motor M as an auxiliary power.

As stated above, output rotation power speed is reduced again by the second planetary gear set PG2 and drives the driving shaft 32 (driving the wheels) via the differential 30.

According to a power system of a hybrid vehicle according to an exemplary embodiment of the present invention, since the motor is disposed separately to the first input shaft and power of the motor is input through a chain transmission, a total length of a power transmitting mechanism can be substantially decreased and cooling performance can be enhanced. Furthermore, since a speed reduction ratio can be regulated by changing a gear ratio of the motor output sprocket and the motor input sprocket, sufficient driving torque can be obtained by a motor having a small power capacity.

In addition, since the second planetary gear set is used as a speed reduction means on the counter shaft, a sufficient final speed reduction ratio can be obtained while eliminating one conventional counter shaft, so that a structure can be simple and manufacturing cost can be decreased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power system of a hybrid vehicle, comprising:
   a first planetary gear set disposed on a first input shaft;
   a generator disposed on said first input shaft;
   a motor disposed on an axis line that is substantially parallel to said first input shaft;
   a means for transmitting a rotation power of the motor to an output element of the first planetary gear set;
   a second planetary gear set disposed on a counter shaft; and
   a means for outputting a power speed of the first planetary gear set to the second planetary gear set;
   wherein said power speed of said first planetary gear set is reduced by said second planetary gear set and subsequently transmitted to a driving wheel via a differential;
   wherein said means for transmitting a rotation power of the motor to an output element of the first planetary gear set comprises: a second input shaft connected to an output element of the first planetary gear set, disposed on an axis line of said first input shaft and connected to the motor by a transmission member.

2. The power system of claim 1, wherein said transmission member comprises:
   a chain connecting a motor output sprocket and a motor input sprocket that are respectively provided to a motor shaft of the motor and the second input shaft.

3. A power system of a hybrid vehicle, comprising:
   a first planetary gear set disposed on a first input shaft;
   a generator disposed on said first input shaft;
   a motor disposed on an axis line that is substantially parallel to said first input shaft;
   a means for transmitting a rotation power of the motor to an output element of the first planetary gear set;
   a second planetary gear set disposed on a counter shaft; and
   a means for outputting a power speed of the first planetary gear set to the second planetary gear set;
   wherein said power speed of said first planetary gear set is reduced by said second planetary gear set and subsequently transmitted to a driving wheel via a differential;
   wherein:
   the second planetary gear set comprises a sun gear, a planetary carrier, and a ring gear;
   the ring gear is connected to an output shaft of the first planetary gear set as an input element;
   the planetary carrier is connected to the differential as an output element; and
   the sun gear is connected to a housing as a fixed element.

* * * * *